C. DE PROSZYNSKI.
PORTABLE KINEMATOGRAPHIC CAMERA.
APPLICATION FILED MAY 10, 1910.
1,052,956.
Patented Feb. 11, 1913.
2 SHEETS—SHEET 2.
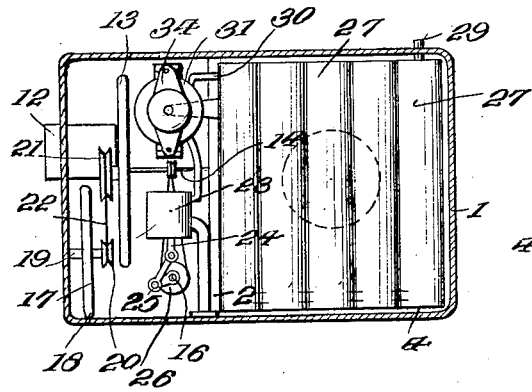
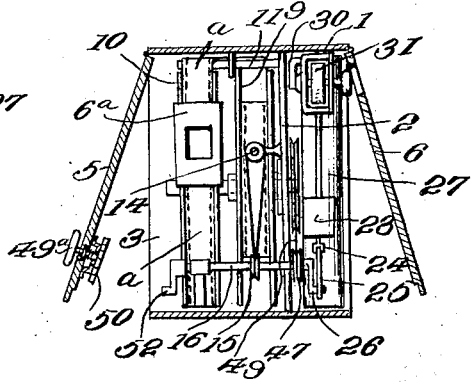
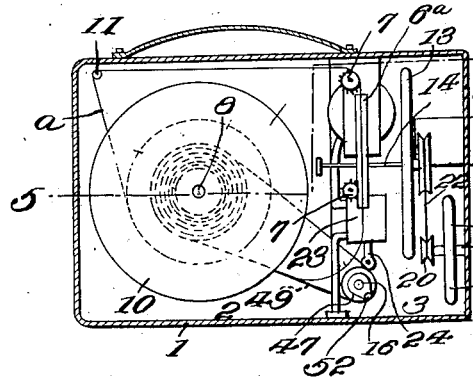
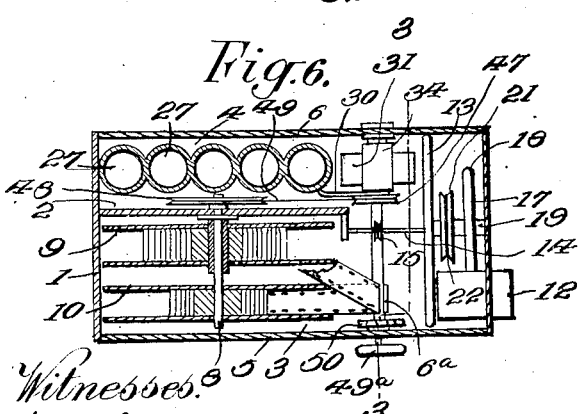
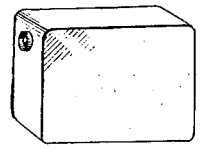
Witnesses:
J. A. Price
G. M. Spring
Inventor:
Casimir de Proszynski
by Richard B. Owen
his Attorney.

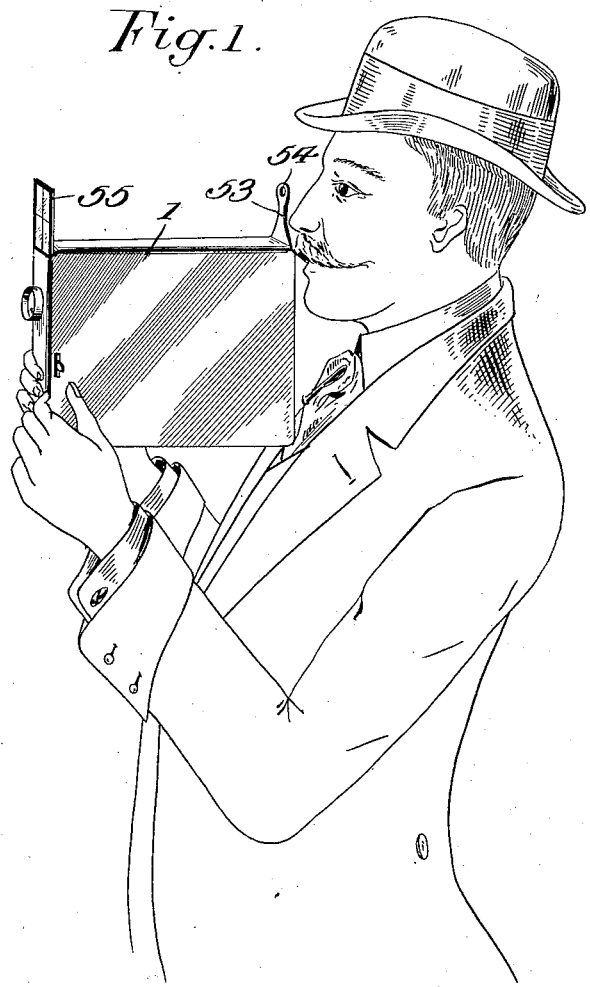

UNITED STATES PATENT OFFICE.

CASIMIR DE PROSZYNSKI, OF WARSAW, RUSSIA.

PORTABLE KINEMATOGRAPHIC CAMERA.

1,052,956.  Specification of Letters Patent.  Patented Feb. 11, 1913.

Application filed May 10, 1910. Serial No. 560,475.

*To all whom it may concern:*

Be it known that I, CASIMIR DE PROSZYN-SKI, a subject of the Emperor of Russia, and resident of Warsaw, Russia, have invented certain new and useful Improvements in Portable Kinematographic Cameras, of which the following is a specification.

This invention relates to improvements in portable cameras for making pictures of animated subjects.

It is of vital importance in animated photography that the camera be of such construction as will permit of the subject being followed in all directions. It is also important that the entire operating mechanism be so arranged in compact form that the camera may be conveniently supported in the hands of the operator, that the latter may be free to follow the subject. This involves the provision of means for steadying the mechanism, so as to eliminate vibration.

The object of my invention is to provide a portable kinematographic camera to enable the operator to follow the subject in any direction and to provide means for preventing vibration of the mechanism when the operator vertically or horizontally changes the position of the camera.

The invention also comprehends improvements in other features, which will be hereinafter described and particularly pointed out in the claims.

In the drawings:—Figure 1 is a view illustrating the camera in use; Fig. 2 is a perspective view of the camera, parts being omitted; Fig. 3 is a vertical section on the line 3—3, of Fig. 6. Fig. 4 is a side elevation, the casing being shown in section; Fig. 5 is a side elevation looking from the opposite side of the camera, the casing being shown in section; Fig. 6 is a horizontal section on the line 5—5 of Fig. 5; Fig. 7 is a detail in elevation of the pressure regulator; Fig. 8 is a vertical central section of the same on the line 8—8 of Fig. 7.

1 indicates a casing provided with a vertical partition 2, to form two compartments 3 and 4. The compartments 3 and 4 are closed by hinged doors 5 and 6, as shown best in Fig. 3.

Kinematographic mechanism of appropriate construction, conventionally indicated in the drawings, is mounted in the compartment 3. This mechanism includes a guide 6$^a$ through which the film $a$, passes and the usual sprockets 7 to engage perforations in the film. On a shaft 8 supported by the partition 2, and extending into the compartment 3, is a film supply reel 9, and a take up reel 10. The film passes from reel 9 up, and over a guide 11 and around sprocket 7 and then through the guide 6. The opposite end of the film is wound on the take up reel 10 which is in alinement with a lens 12, located in the front of the casing. The specific arrangement of the reels, and their mounting has been divided from this application, and claimed in an application filed Nov. 25, 1912, Serial No. 733,428. A shutter 13 is mounted in the front portion of the casing and is conveniently arranged so as to operate between the guide 6 and the lens 12, as shown in Fig. 6.

The shutter 13 is mounted on a shaft 14 which is operated as at 15, by the power 16, mounted in the lower portion of the casing 1. A gyroscope 17, is mounted in the casing and comprises a weighted disk 18, secured to a shaft 19. On the shaft 19, is a small grooved pulley 20, around which and a much larger pulley 21, on the shutter shaft 14, passes a belt 22.

A motor 23, of appropriate type is supported in the fore part of the compartment 4 and includes a piston rod 24, and pitman 25. The pitman rod is pivoted to a crank 26, on the power shaft 16, whereby to rotate the latter in the operation of the camera.

A number of intercommunicating compressed air tubes 27 are located in the compartment 4, and constitute a reservoir. Compressed air is forced into these tubes by a pump or other suitable means, a valved inlet nipple 29, being provided for this purpose. A pipe 30 leads from the reservoir to a pressure reducing device 31. This device includes a chamber 32 supported in a frame 33 fastened in the casing 1. The outer ends of the frame 33, are connected by a flexible plate 34, formed with a threaded opening 35, in which fits the threaded end of a nut 36.

37, indicates a valve which coöperates with a valve seat 38 formed in the frame 33 and from the valve extends a stem 39. The valve stem passes through the chamber 32 and the nut 36 and is rigidly secured to the outer portion of the chamber 36 as indicated at 40, while on its outer end is a flange 41 with which the nut 36 coöperates.

The pipe 30, enters a chamber 42, which also communicates through the valve seat 38, with the chamber 32. A pipe 43, extends from the chamber 32 to the cylinder of the motor 23.

The pressure in the reservoir is of course much greater than that required to operate the motor, hence it is necessary to provide the pressure reducing device to prevent as much as possible the liability of loss of pressure and to cause the motor to be uniformly operated. When the nut 36, is screwed inwardly toward the chamber 32, pressure on the flange 41 is removed and the flexible end wall of the chamber 32 will assume its normal condition, and as the valve stem is secured to said wall, the valve will be removed from its seat and the air from the reservoir will pass into the chamber 32. When sufficient air to operate the motor enters the chamber 32, the outer end wall will flex and automatically close the valve until the pressure in chamber 32 is reduced when the valve will again automatically open.

If it be desired to cut off the air from the motor, which is desirable when the camera is not used, the nut 36, is screwed outwardly against the flange 41, which closes the valve 37 on its seat and cuts off the air supply.

The flexible plate 34 serves to brace and support the valve stem and the receptacle 32 and it also permits of the stem being drawn out sufficiently to insure of the valve closing tightly on its seat when the nut contacts with the flange 41.

A pointer 45, and a scale 46, serve as a means for a visible indication of the pressure in the chamber 32.

On the power shaft 16, is a grooved pulley 47, around which and a similar pulley 48, on the shaft 8, passes a belt 49, to rotate the film receiving reel 10.

49ª indicates a stopping and starting button, the inner end of which is provided with a star wheel 50, normally held close to the inner surface of the door 5, by a spring 51. The star wheel is located adjacent a crank pin 52, on the crank shaft so that upon applying pressure to the button and also imparting to it a slight rotary motion, the star wheel will engage the crank pin and rotate the power shaft and start the motor. Such an arrangement is necessary owing to the fact that the pitman 25 and crank will be on a dead center when the motor is stopped.

To stop the motor the operator simply pushes the button 49 inwardly to bring the star wheel into engagement with the crank pin of the crank 52.

On top of the rear end of the camera is a projection 53, formed with a sight opening 54. At the forward end of the camera is a field finder 55 which with the sight opening serves as a means for sighting the subject being photographed.

The field finder comprises an open frame with cross bars extending across the same. The opening 54, is coincident with the point where the bars of the field finder cross and as the area of the frame is proportioned to the exposed portion of the film, any view seen through the sight opening and the frame will correspondingly appear on the film when the shutter is operated.

In operation the rear end of the camera rests on the chest of the operator and the forward end is supported by the hands, as clearly indicated in Fig. 1. The subject to be photographed is located by the operator through the medium of sight opening and the field finder, and with the fingers of one hand the button 49ª is manipulated to start the motor. The subject may make a wide detour, but as the camera is held by the operator, and as the latter is free to move in any direction the position of the subject is of little consequence. If perchance, the subject should suddenly run up or down a hill, the operator can conveniently tilt or turn the camera, to suit his convenience. In fact, because of the entire operating mechanism being portable and in such compact form, and the power means being so arranged that it can be controlled by the fingers, photographs of animated subjects can be made under the most difficult conditions, and under circumstances which heretofore have been impossible to overcome.

The operator in making a picture of an animated subject is naturally nervous, and aside from this condition, there is always a certain amount of vibration of a camera when held in the hands, which of course, will reflect on the film, and when the pictures are reproduced on a screen this slight vibration is greatly magnified, and is decidedly objectionable. But I have found that this difficulty is readily overcome by providing the gyroscope to steady the camera while making the photograph. The weighted wheel rapidly rotates and the gyroscope effect removes the vibration during the period of exposure, even if following a subject under extremely difficult circumstances.

As the forward end of the camera is most likely to vibrate, I find it advisable to locate the gyroscope as near the front of the casing as possible.

As my invention relates to a portable kinematographic camera provided with a fluid motor for operating the mechanism while photographing, I have not deemed it necessary to specifically illustrate the details of construction of the kinematographic mechanism, as it is evident any appropriate, well known type of such mechanism may be employed.

I claim—

1. A portable kinematographic camera adapted to be held by an operator and controlled by the hands, comprising a casing, kinematographic mechanism including a shaft mounted in the casing, a motor for operating the shaft, a reservoir for carrying motive fluid for operating the motor, a pressure regulator interposed between the reservoir and the motor, to maintain a constant and uniform source of energy to the motor, and a finger operated stopping and starting device to control the mechanism.

2. A portable kinematographic camera adapted to be held by an operator and controlled by the hands, comprising a casing, kinematographic mechanism including a shaft mounted in the casing, a motor for operating the shaft, a reservoir for carrying motive fluid for operating the motor, and a gyroscope located in the casing to steady the camera.

3. A portable kinematographic camera adapted to be held by an operator and controlled by the hands, comprising a casing, kinematographic mechanism including a shutter, a gyroscope including a shaft and disk operating in conjunction with the shutter, a motor for operating the kinematographic mechanism, means carried in the casing for storing energy to operate the motor, and a finger operated device on the casing for stopping and starting the motor.

4. A portable kinematographic camera adapted to be held by an operator and controlled by the hands, comprising a casing, kinematographic mechanism, a motor in the casing for operating the kinematographic mechanism, a reservoir for carrying motive fluid for operating the motor, means for governing the speed of the motor, and means to start the kinematographic mechanism.

5. A portable kinematographic camera adapted to be held by an operator and controlled by the hands, comprising a casing, kinematographic mechanism including a shaft and a shutter, a gyroscope disposed in the casing the axis of which is parallel to the shaft and to the axis of the shutter, a motor for operating the shutter and gyroscope, an air reservoir carrying compressed air for operating the motor, a pressure regulator interposed between the motor and the reservoir to maintain a constant and uniform source of energy to the motor and means for starting and stopping the motor.

6. A portable kinematographic camera adapted to be held by an operator and controlled by the hands, comprising a casing, a partition in the casing to form two compartments, reels mounted in one compartment, kinematographic mechanism disposed in front of one of the reels, guides over which a film is directed to the kinematographic mechanism, a motor and source of energy for operating the latter in the second mentioned compartment, a gyroscope disposed in the front portion of the casing, means between the motor, kinematographic mechanism and the gyroscope for operating said mechanism and gyroscope and means for stopping and starting the motor.

7. A portable kinematographic camera adapted to be held by an operator and controlled by the hands, comprising a casing, kinematographic mechanism in the casing, a fluid motor in the casing for operating the kinematographic mechanism, means including a motive fluid reservoir carried by the casing for operating the motor, means for controlling the speed of the motor, and means for stopping and starting the motor.

8. A portable kinematographic camera adapted to be held by an operator and controlled by the hands, comprising a casing, kinematographic mechanism in the casing, a gyroscope coöperating with the kinematographic mechanism, a motor in the casing for operating the kinematographic mechanism and the gyroscope, means carried by the casing for operating the motor, means for controlling the speed of the motor, and means for stopping and starting the motor.

9. A portable kinematographic camera adapted to be held by an operator and controlled by the hands, comprising a casing, kinematographic mechanism in the casing, a gyroscope coöperating with the kinematographic mechanism and located in the forward end of the casing, means for operating the kinematographic mechanism and the gyroscope, and means for stopping and starting the motor.

10. A portable kinematographic camera adapted to be held by an operator and controlled by the hands, comprising a casing, kinematographic mechanism mounted in the casing, a fluid motor in the casing, connections between the fluid motor and the kinematographic mechanism for operating the latter, a portable source of power carried by the operator and connected with the fluid motor for operating the latter, means for maintaining a constant and uniform source of energy to the motor and stopping and starting means adapted to be controlled by the hands of the operator during any movement of the camera while photographing a subject.

11. A portable kinematographic camera adapted to be held by an operator and controlled by the hands comprising a casing, kinematographic mechanism including a rotating shutter mounted in the casing, means for operating the kinematographic mechanism and a gyroscope located in the forward part of the casing, the axis of the gyroscope and the axis of the shutter being parallel.

12. A kinematographic camera comprising a casing, kinematographic mechanism in the casing, a gyroscope to steady the movement of the camera, and means including a motor for operating the mechanism.

13. A kinematographic camera comprising a casing, kinematographic mechanism mounted in the casing, a gyroscope in the casing, and a single motor in the casing for operating the kinematographic mechanism and the gyroscope.

14. A portable kinematographic camera adapted to be held by an operator and controlled by the hands comprising a casing, kinematographic mechanism including a shutter mounted in the casing, means independent of the motor for steadying the movement of the camera while photographing a subject, and means including a motor for operating the mechanism.

In testimony whereof I have hereunto set my hand in presence of two witnesses.

CASIMIR DE PROSZYNSKI.

Witnesses:
  CYRILL SUDWICKI,
  ANDRZEJ KUCWEJ.